/ Patented May 17, 1938

2,117,745

UNITED STATES PATENT OFFICE 2,117,745

AZO DYES

Gustav Reddelien, Leipzig, and Georg Matthaeus, Wolfen, Kreis Bitterfeld, Germany, assignors to General Aniline Works, Inc., New York, N. Y., a corporation of Delaware No Drawing. Application July 28, 1937, Serial No. 156,142. In Germany August 26, 1936

8 Claims. (Cl. 260—97)

Our present invention relates to a process for manufacturing new azo dyes and more particularly to such dyes which are especially useful in dyeing leather.

Further objects of our invention are the new azo dyes obtainable according to this process.

We have found that azo dyes dyeing leather valuable brown tints mostly of very good fastness to light, are obtained when diazotizing an amine of the general formula

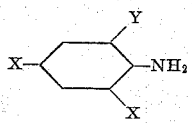

wherein X is any negative substituent, such as NO₂, Cl, SO₃H and so on, Y is a positive group, such as O-alkyl and alkyl which may optionally contain a substituent lending solubility in water and coupling the diazo compound with a diphenylamine of the general formula

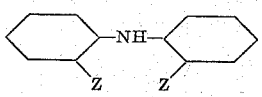

Z being hydrogen or groups lending solubility in water, for instance, —COOH or —SO₃H, of which one Z must be such a group.

These dyes are characterized by the especially beautiful tints of the dyeings they produce on leather and the very good fastness to light, acid and alkali of such dyeings. Among these easily soluble dyes are those which render possible a thorough dyeing throughout of the leather so that the surface dyeing and the dyeing in the section show equal tone strength. As compared with the red-brown tints of the known dyes from 2-chloro-4-nitro-1-aminobenzene and diphenylamine-4-sulfonic acid the dyes of the above constituents yield tints which are more on the yellow side.

The following examples illustrate the invention, the parts being by weight:—

*Example 1.*—231 parts of 2-methyl-6-bromo-4-nitro-1-aminobenzene or 186.5 parts of 2-methyl-6-chloro-4-nitro-1-aminobenzene are diazotized in the known manner by means of nitrosyl sulfuric acid and the aqueous diazo-solution is added to a solution of 315 parts of diphenylamine-2-carboxy-2'-sulfonic acid and an excess of sodium acetate in water. The dye precipitates in a smeary condition but after prolonged stirring becomes pulverulent and easily capable of filtration. It is a brown powder soluble in water to a red-brown solution. Chrome calf is treated in the dye bath in the usual manner and is thus dyed brown.

*Example 2.*—311 parts of 2-amino-3-bromo-5-nitro-1-benzyl-sulfonic acid are dissolved in 1000 to 3000 parts of water and diazotized in the usual manner. The finished diazo-solution is added gradually to a solution of 315 parts of diphenylamine - 2 - carboxy - 2'-sulfonic acid in about 5000 parts of water. After prolonged stirring the mixture is neutralized with sodium hydroxide solution and evaporated to dryness. Chrome calf is dyed by this dye brown tints very fast to light.

*Example 3.*—311 parts of 2-amino-3-bromo-5-nitro-1-benzyl-sulfonic acid is diazotized as described in Example 3 and the solution is added to one of the sodium salt of 260 parts of diphenylamine-2.2'-dicarboxylic acid in water containing 250 parts of crystallized sodium acetate. When coupling is complete the dye is salted out, filtered with suction, washed and dried. This freely water-soluble dye dyes chrome calf red-brown, the dyeing being very fast.

*Example 4.*—186.5 parts of 2-methyl-6-chloro-4-nitro-1-aminobenzene are diazotized in the known manner by means of nitrosyl sulfuric acid. The aqueous solution of the diazo compound is added to a solution of 343 parts of sodium-3-amino - 2 - methyl - 4' - nitrodiphenyl-amine-2'-sulfonate. When coupling is complete the dye is filtered, washed, dissolved by addition of an alkali and again separated by a common salt. It forms a dark brown powder dyeing leather dark-brown tints.

*Example 5.*—186.5 parts of 2-methyl-6-chloro-4- nitro - 1 - aminobenzene are diazotized in the known manner by means of nitrosyl sulfuric acid. The aqueous solution of the diazo compound is gradually added to a solution of 328 parts of the sodium salt of 4-acetaminodiphenylamine-2-sulfonic acid. After prolonged stirring the dye is separated by addition of common salt, filtered, washed and dried. It forms a dark powder which dyes leather brown tints of very good fastness.

*Example 6.*—333 parts of the sodium salt of 1-amino-4-nitro-6-bromo-2-benzylsulfonic acid are diazotized in the usual manner and the diazo solution is slowly added to one containing 328 parts of the sodium salt of the 4-acetamino-diphenylamine-2-sulfonic acid. When coupling is complete the solution is neutralized by means of caustic soda and dried under diminished pressure at about 40 to 50° C. The dye thus obtained has an especially good solubility and dyes leather beautiful brown tints of good fastness.

What we claim is:—

1. The dyes which correspond to the general formula

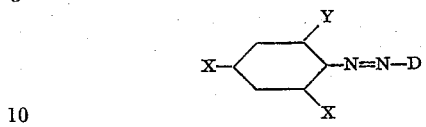

wherein X is a negative substituent of the group consisting of —NO₂, halogen, —SO₃H, Y is a positive substituent of the group consisting of alkyl, O—alkyl, alkyl—SO₃H and D is the radicle of a diphenylamine substituted in at least one ortho-position to the —NH— group by a substituent lending solubility of the group consisting of —SO₃H and —COOH, said dyes dyeing leather valuable brown tints of very good fastness to light.

2. The dyes which correspond to the general formula

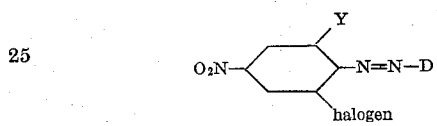

wherein Y is a positive substituent of the group consisting of alkyl, O—alkyl, alkyl—SO₃H and D is the radicle of a diphenylamine substituted in at least one ortho-position to the —NH— group by a substituent lending solubility of the group consisting of —SO₃H and —COOH, said dyes dyeing leather valuable brown tints of very good fastness to light.

3. The dyes which correspond to the general formula

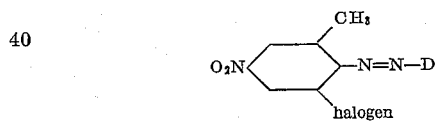

wherein D is the radicle of a diphenylamine substituted in at least one ortho-position to the —NH— group by a substituent lending solubility of the group consisting of —SO₃H and —COOH, said dyes dyeing leather valuable brown tints of very good fastness to light.

4. The dyes which correspond to the general formula

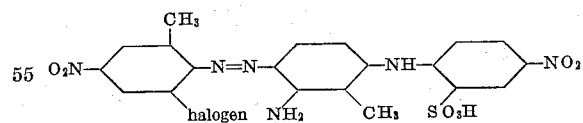

said dyes dyeing leather valuable brown tints of very good fastness to light.

5. The process which comprises diazotizing an amine of the general formula

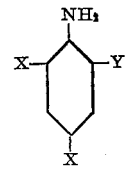

wherein X is a negative substituent of the group consisting of —NO₂, halogen, —SO₃H and Y is a positive substituent of the group consisting of alkyl, —O—alkyl, alkyl—SO₃H, and coupling the diazo compound with a diphenylamine bearing in at least one ortho-position to the —NH— group a substituent lending solubility of the group consisting of —SO₃H and —COOH.

6. The process which comprises diazotizing an amine of the general formula

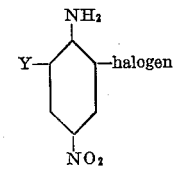

wherein Y is a positive substituent of the group consisting of alkyl, —O—alkyl, alkyl—SO₃H, and coupling the diazo compound with a diphenylamine bearing in at least one ortho-position to the —NH— group a substituent lending solubility of the group consisting of —SO₃H and —COOH.

7. The process which comprises diazotizing an amine of the general formula

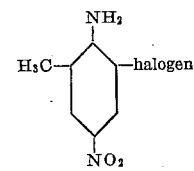

and coupling the diazo compound with a diphenyl-amine bearing in at least one ortho-position to the —NH— group a substituent lending solubility of the group consisting of —SO₃H and —COOH.

8. The process which comprises diazotizing a 1-amino-2-halogeno-4-nitro-6-methylbenzene and coupling the diazo compound with 3-amino-2-methyl-4'-nitrodiphenylamine-2'-sulfonic acid.

GUSTAV REDDELIEN.
GEORG MATTHAEUS.